Nov. 1, 1949  J. T. LANE  2,486,790
AUTOMOBILE SAFETY LOCK
Filed Dec. 22, 1945
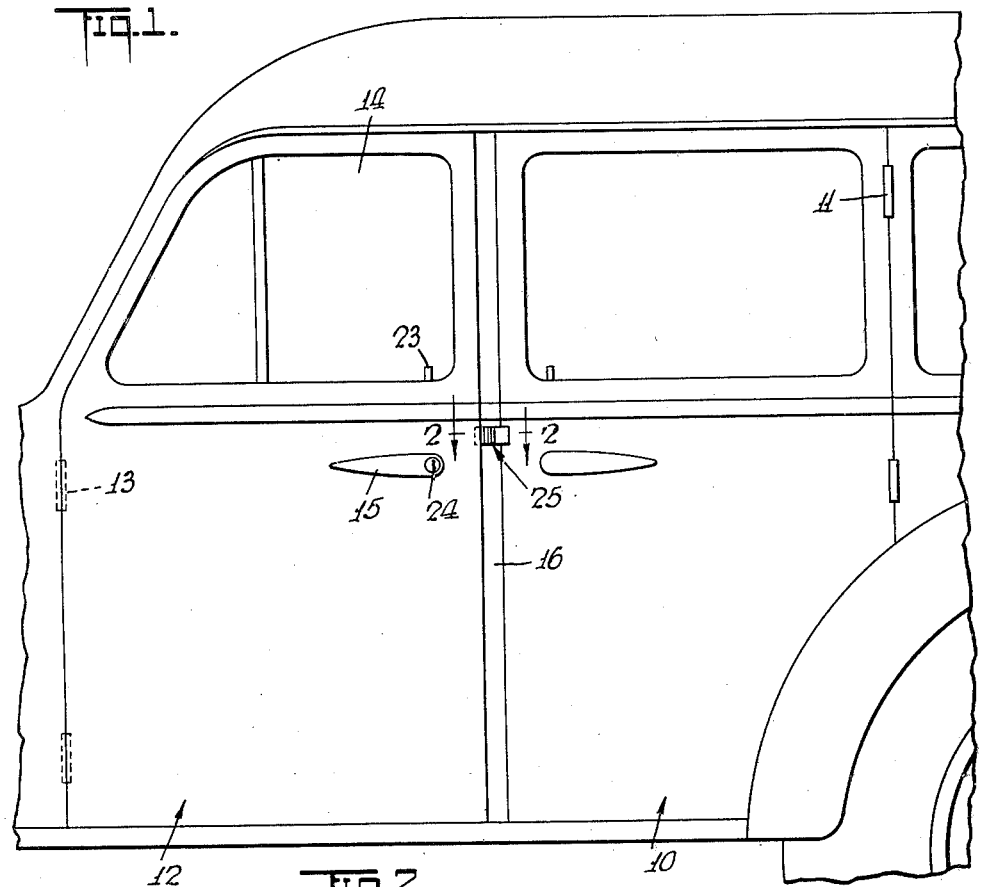
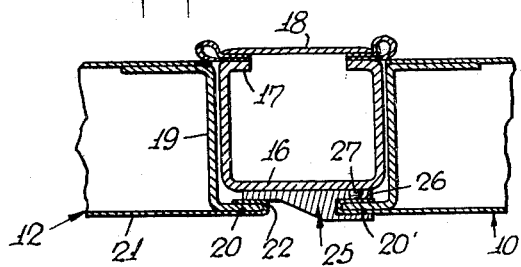
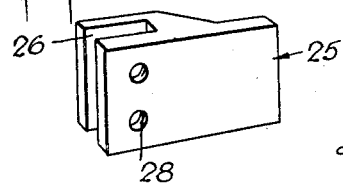
INVENTOR
J. Thomas Lane
BY
Dean Fairbank + Hirsch
ATTORNEYS Patented Nov. 1, 1949

2,486,790

UNITED STATES PATENT OFFICE 2,486,790

AUTOMOBILE SAFETY LOCK

Jacob Thomas Lane, McKeesport, Pa.

Application December 22, 1945, Serial No. 637,008

1 Claim. (Cl. 292—1)

The present invention is concerned with safety locks for automobiles.

The four-door sedan, despite its general popularity, involves a serious hazard to small children, due to the ease with which the rear doors are opened while the car is in motion. Moreover, unless the rear doors are at all times kept locked during driving there is danger of pilfering during stoppage, as for instance at a traffic stop light.

Where it is attempted to assure maintaining the rear doors locked throughout transit, by automatic control from the operating motor, or from an operating accessory thereof, the equipment for the purpose is generally complicated, difficult and costly to install and easily subject to derangement.

It is accordingly an object of the present invention to provide a safety lock for automobile rear doors, which shall be of utmost simplicity, which shall be devoid of pneumatic or electric control or even of moving mechanical parts, which shall be compact, inexpensive and easy to install on automobiles of standard construction and which shall be proof against opening of the rear door as long as the front door remains closed, and this regardless of whether or not the vehicle is moving or the engine is operating.

In the accompanying drawings in which is shown one of various possible embodiments of the several features of the invention, Fig. 1 is a side elevation of a fragment of a four-door sedan with parts broken away on which a safety lug embodying my invention has been installed, Fig. 2 is a view in transverse cross section on a larger scale, taken on line 2—2 of Fig. 1 and Fig. 3 is a perspective view on a still larger scale of the lug element of the safety lock.

Referring now to the drawings, there is shown a fragment of the body of a conventional automobile sedan comprising a rear door 10 hinged at its rear edge as at 11 and a front door 12 hinged at its forward edge as at 13, each door having a window 14. Between the doors is the upright or jamb 16 of the body against which both of the doors are closed. The jamb is desirably of a metal channel bar as shown with inturned edges 17 covered at the inside by fabric 18. As usual, each door has a frame 19 provided with a lip 20 along the outer vertical edge thereof, over which the edge of the front panel 21 is reversely bent as at 22. The lips 20 and 20' of the front and rear doors overlap the jamb 16. Each door is held closed by the conventional latch, controlled by handle 15 and is locked as for instance, by depression of a button 23 at the inside of the door. The front door has a lock, the keyhole for which is shown at 24. As thus far described, the construction is substantially conventional.

According to the present invention, a metal lug 25, desirably of steel is affixed to the rear door in such relation that the lug in closed position of the rear door overlaps the jamb 16. Preferably the lug is of small width, in the order of an inch or more and is located immediately above the level of the door handle 15 and below the level of the door window 14. The lug desirably has a back face conformed to the front face of the jamb 16, both said lug face and said jamb face being preferably flat, as shown, for face-to-face contact of the lug against the jamb when the rear door is closed. The lug extends across the width of the jamb to nearly the opposite edge thereof, as shown, that is for a width sufficient to be overlapped, as shown, by the lip 20 of the front door 12 when the latter is closed.

While the lug could be welded, riveted or otherwise firmly and permanently secured to the rear door, a simple and convenient construction is that shown in the drawings, in which the lug is formed as a unitary forging with a bifurcation 26 at one lateral edge thereof, accommodating the thickness of the lip 20' of the rear door and secured thereto desirably by a pair of screws 27 accommodated in screw holes 28 through the inner face of the lug, screws which are, therefore, not accessible from the exterior of the closed vehicle. The screws desirably press at their inner ends in the manner of set screws against the inner face of lip 20.

It will be seen that in use the rear door cannot be closed if the front door has been closed first, nor is it possible to open the rear door until after the front door has been opened.

Accordingly, by the arrangement set forth, a simple safety lock for the rear door has been provided, which precludes the opening of the latter during transit or in standing as long as the front door is kept closed. The safety lock functions as long as the front door remains closed, regardless whether or not the front door be itself locked and regardless whether the engine is running or still.

By the present invention the safety lock may be installed at small cost in a few minutes upon any conventional sedan with all of the advantages above pointed out. Such safety locks could be provided as standard equipment by the automobile manufacturer, substantially without added cost, since by the use of such lock, the rear door latch locks become superfluous and could be dispensed with.

As many changes could be made in the above construction, and many apparently widely different embodiments of this invention could be made without departing from the scope of the claim, it is intended that all matter contained in the above description or shown in the accompanying drawings shall be interpreted as illustrative and not in a limiting sense.

Having thus described my invention, what I claim as new and desire to secure by Letters Patent of the United States is:

As an article of manufacture a rear door safety lock for an automobile of the type having front and rear hinged doors and an intervening common jamb with each of said doors having a vertical lip portion overlapping such jamb, said lock comprising a substantially rectangular lug of length slightly greater than the distance between such lips when the doors are closed, said lug having a flat back face and being thicker at the portion thereof adjacent one of its lateral edges than at the portion thereof adjacent its other lateral edge, said first named lateral edge being bifurcated along the length thereof and means to affix said lug on the lip of such rear door, whereby when said bifurcated lateral edge of said lug straddles the lip of such rear door and said lug is affixed thereto, the flat back face of said lug will be in face to face engagement with the jamb in the closed position of the rear door, with the lip of said front door in the closed position of the latter, overlapping the relatively thin portion of said lug.

JACOB THOMAS LANE.

REFERENCES CITED

The following references are of record in the file of this patent:

UNITED STATES PATENTS

| Number | Name | Date |
|---|---|---|
| 1,552,690 | Frantz | Sept. 8, 1925 |
| 2,311,132 | Schnell | Feb. 16, 1943 |